(12) United States Patent
Tak et al.

(10) Patent No.: US 9,415,475 B2
(45) Date of Patent: Aug. 16, 2016

(54) CONVEYER APPARATUS FOR DISCHARGING CHIPS

(71) Applicant: O-SUNG MECHATRONICS CO., Ltd, Changwon-si, Gyeongsangnam-do (KR)

(72) Inventors: Keumsuk Tak, Changwon-si (KR); Wonchol Gu, Changwon-si (KR)

(73) Assignee: O-SUNG MECHATRONICS CO., LTD, Changwon-si, Gyeongsangnam-do (KR)

( * ) Notice: Subject to any disclaimer, the term of this patent is extended or adjusted under 35 U.S.C. 154(b) by 0 days.

(21) Appl. No.: 14/798,513

(22) Filed: Jul. 14, 2015

(65) Prior Publication Data
US 2016/0016271 A1 Jan. 21, 2016

(30) Foreign Application Priority Data
Jul. 18, 2014 (KR) .................. 10-2014-0091123

(51) Int. Cl.
| B65G 45/22 | (2006.01) |
| B08B 3/04 | (2006.01) |
| B01D 43/00 | (2006.01) |
| B23Q 11/00 | (2006.01) |
| B23Q 11/10 | (2006.01) |

(52) U.S. Cl.
CPC ........ B23Q 11/0057 (2013.01); B23Q 11/1069 (2013.01)

(58) Field of Classification Search
CPC .......... B65G 45/22; B08B 3/04; B08B 3/042; B01D 43/00
USPC ................. 198/495; 134/43, 48; 210/526, 528
See application file for complete search history.

(56) References Cited

U.S. PATENT DOCUMENTS

| 2,731,151 | A | * | 1/1956 | Hopper | C22B 1/005 210/141 |
| 3,455,457 | A | * | 7/1969 | Popelar | B01D 21/0012 210/167.04 |
| 3,734,776 | A | * | 5/1973 | Keogh, Jr. | B08B 3/042 134/10 |
| 3,795,316 | A | * | 3/1974 | Wood | B01D 21/0012 210/298 |
| 4,396,506 | A | * | 8/1983 | Damerau | B01D 29/05 210/107 |
| 4,567,906 | A | * | 2/1986 | Brule' | B65G 49/0418 134/127 |
| 4,774,010 | A | * | 9/1988 | Bratten | B01D 29/009 210/387 |

(Continued)

FOREIGN PATENT DOCUMENTS

| JP | 1997-300171 A | 11/1997 |
| JP | 2004-203556 A | 7/2004 |

(Continued)

*Primary Examiner* — Douglas Hess
(74) *Attorney, Agent, or Firm* — Paratus Law Group, PLLC (57) ABSTRACT

A conveyer apparatus for discharging chips is disclosed herein. The conveyer apparatus includes a tank body, a conveyer unit, and an opening/closing unit. The tank body is configured such that the tank body is configured in the form of a container body, an inlet is formed in the top surface of one side of the tank body, and a chip outlet is formed in the bottom surface of the remaining side of the tank body. The conveyer unit is installed in the form of a caterpillar spaced apart from the inner walls of the tank body, and has at least one opening so that the inner and outer spaces of the conveyer unit communicate. The opening/closing unit is installed to block the opening, and operates so as to open the opening when the corresponding opening passes through a surface opposite the inner bottom surface of the tank body.

4 Claims, 10 Drawing Sheets

(56) References Cited

U.S. PATENT DOCUMENTS

| | | | | |
|---|---|---|---|---|
| 4,966,672 A * | 10/1990 | Levit | ............... | C25D 17/28 |
| | | | | 118/423 |
| 5,106,487 A * | 4/1992 | Nemedi | ............ | B03B 9/061 |
| | | | | 209/133 |
| 5,683,210 A * | 11/1997 | Phillips | ............ | B08B 3/022 |
| | | | | 134/144 |
| 5,992,642 A * | 11/1999 | Ota | ............ | B01D 33/04 |
| | | | | 210/394 |
| 6,357,576 B1 * | 3/2002 | Enomoto | ......... | B01D 21/2455 |
| | | | | 198/495 |
| 6,601,691 B1 * | 8/2003 | Enomoto | ......... | B23Q 11/0057 |
| | | | | 198/495 |
| 6,612,314 B2 * | 9/2003 | Bratten | ............ | B08B 3/022 |
| | | | | 134/10 |
| 6,695,122 B2 * | 2/2004 | Enomoto | ......... | B23Q 11/0057 |
| | | | | 198/495 |
| 7,364,032 B2 * | 4/2008 | Nisiguchi | ......... | B23Q 11/0057 |
| | | | | 198/495 |
| 7,638,061 B2 * | 12/2009 | Moore | ............ | B01D 33/04 |
| | | | | 210/167.03 |
| 8,029,670 B2 * | 10/2011 | Dietenhauser | ......... | B01D 29/01 |
| | | | | 210/232 |

FOREIGN PATENT DOCUMENTS

| | | |
|---|---|---|
| KR | 20-0188002 Y1 | 7/2000 |
| KR | 10-0321360 B1 | 3/2002 |
| KR | 10-0428464 B1 | 4/2004 |
| KR | 10-0907054 B1 | 7/2009 |
| KR | 10-1179924 B1 | 9/2012 |

* cited by examiner

FIG.10

CONVEYER APPARATUS FOR DISCHARGING CHIPS

CROSS REFERENCE TO PRIOR APPLICATION

This application claims priority to Korean Patent Application No. 10-2014-0091123 (filed on Jul. 18, 2014), which is hereby incorporated by reference in its entirety.

BACKGROUND

1. Technical Field

The present invention relates generally to a conveyer apparatus and, more particularly, to a new type of conveyer apparatus for discharging chips that enables cutting chips entering into the inner space of a conveyer unit to be discharged into the outer space of the conveyer unit, thereby preventing a filtering drum provided in the inner space of the conveyer unit from being damaged by the cutting chips.

2. Description of the Related Art

In general, conveyer apparatuses for discharging chips are provided in various machine tools (for example, lathes, drilling machines, milling machines, machining centers, etc.), and extract cutting chips from the cutting chips and cutting oil generated when a workpiece is machined by a corresponding machine tool and separately discharge them. These conveyer apparatuses for discharging chips enable cutting oil to be reused.

The conveyer apparatuses for discharging chips transfer cutting chips discharged from the machine tool using a conveyer commonly installed in the form of a caterpillar so that the cutting chips can be collected in a separate chip collection box. During this process, the cutting oil included in the cutting chips can be stored in a cutting oil tank, above which the corresponding conveyer passes, via the gaps of the conveyer.

Technologies related to the above-described conveyer apparatuses are disclosed in various documents, including Korean Patent No. 10-0321360, Korean Utility Model Registration No. 20-0188002, Korean Patent No. 10-0428464, Korean Patent No. 10-0907054, Korean Patent No. 10-1179924, etc.

In particular, conventionally, a filtering drum configured to filter out fine impurities (fine cutting chips) from cutting oil within a cutting oil tank is additionally provided. This filtering drum enables cutting oil to be substantially reused.

However, the filtering drum is problematic in that its filter may be damaged because when the filtering drum is simply installed within the cutting oil tank, it is exposed to cutting chips discharged via a conveyer. Accordingly, Korean Patent No. 10-0321360 discloses a technology in which a filtering drum is located inside a conveyer and is thus protected from the influence of cutting chips.

However, the above conventional technology configured as described above still causes a concern about fine cutting chips infiltrating into a portion where the filtering drum is located, i.e., the inside of a portion through which the corresponding conveyer passes, via various gaps of the conveyer. Cutting chips infiltrating into the inner side of the conveyer cannot be easily discharged, and thus they are unavoidably stacked on the inner portion of the conveyer. Accordingly, concerns about the clogging of the meshes of the filter of the filtering drum and damage thereto still remain.

Therefore, an operator suffers from inconvenience in which he or she must continuously clean the inner portion of the conveyer of the conveyer apparatus for discharging chips. In particular, to clean the inner portion of the conveyer, the conveyer must be disassembled, and problems arise in that the disassembly work is very complicated and a long period of time is required.

SUMMARY

Accordingly, the present invention has been made keeping in mind various problems occurring in the prior art, and an object of the present invention is to provide a new type of conveyer apparatus for discharging chips that enables cutting chips entering into the inner space of a conveyer unit to be smoothly discharged into the outer space of the conveyer unit, thereby preventing a filter provided in the inner space of the conveyer unit from being damaged by the cutting chips.

In accordance with an aspect of the present invention, there is provided a conveyer apparatus for discharging chips, including: a tank body configured such that the tank body is configured in the form of a container body having an operation and installation space, an inlet via which cutting chips containing cutting oil enter is formed in the top surface of one side of the tank body, and a chip outlet via which the cutting chips are discharged is formed in the bottom surface of the remaining side of the tank body; a conveyer unit installed in the form of a caterpillar that reciprocates between both side ends of the tank body while being spaced apart from the inner walls of the tank body, and configured to have at least one opening that is open so that the inner and outer spaces of the conveyer unit communicate with each other; and an opening/closing unit installed to block the opening of the conveyer unit, and configured to operate so as to open the opening when the corresponding opening passes through a surface opposite the inner bottom surface of the tank body.

The conveyer unit may include: a plurality of sprockets installed to be opposite each other along the surfaces of both side walls of the tank body; two chain assemblies formed by connecting a plurality of chains that are installed around the sprockets; a plurality of support shafts configured such that both ends of each of the support shafts pass through each chain of the two chain assemblies while being coupled with the two chain assemblies; a plurality of blocking plates configured such that each of the blocking plates is installed to block a gap between neighboring support shafts while the front and rear ends of the blocking plate are being coupled with the neighboring support shafts, and configured to provide guidance so that cutting chips are carried on the outer surfaces of the blocking plates; and a drive motor operatively coupled with at least any one of the sprockets, and configured to rotate the corresponding sprocket.

The opening may be formed between at least some of the support shafts constituting the conveyer unit in the open state in which a corresponding blocking plate is not present; and the opening/closing unit may be rotatably mounted on any one of two support shafts in a portion where the opening is formed, and may be configured in the form of a hinge structure plate so that it is rotated around the support shaft by the weight thereof and thus opens the opening when the corresponding opening passes through a surface opposite the inner bottom surface of the tank body and closes the opening when the corresponding opening passes through a surface opposite the inner top surface of the tank body.

At least some of the blocking plates that constitute the conveyer unit may be formed in perforated plate structures in which a plurality of through holes configured to pass cutting oil therethrough is formed.

The outer surface of the conveyer unit may include: a plurality of scrapers configured to transfer cutting chips present between the conveyer unit and the tank body in the direction in which cutting chips are transferred by the corresponding conveyer unit; and a plurality of separation hooks configured to forcibly separate cutting chips present between the conveyer unit and the tank body.

BRIEF DESCRIPTION OF THE DRAWINGS

The above and other objects, features and advantages of the present invention will be more clearly understood from the following detailed description taken in conjunction with the accompanying drawings, in which.

DETAILED DESCRIPTION

A conveyer apparatus for discharging chips according an embodiment of the present invention will be described with reference to FIGS. 1 to 10 below.

Figure 1:
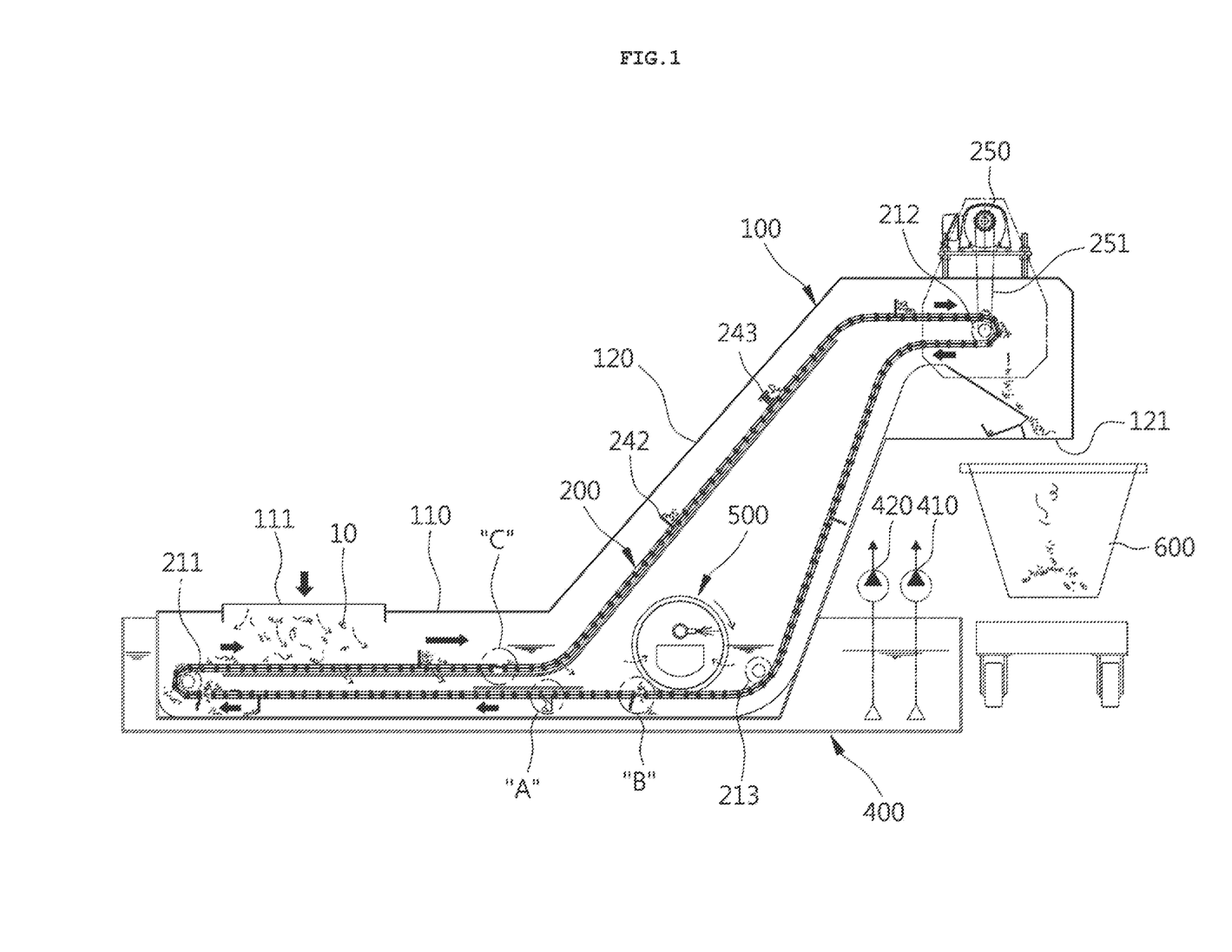
FIG. 1 is a front view illustrating a conveyer apparatus for discharging chips according to an embodiment of the present invention.
Figure 2:
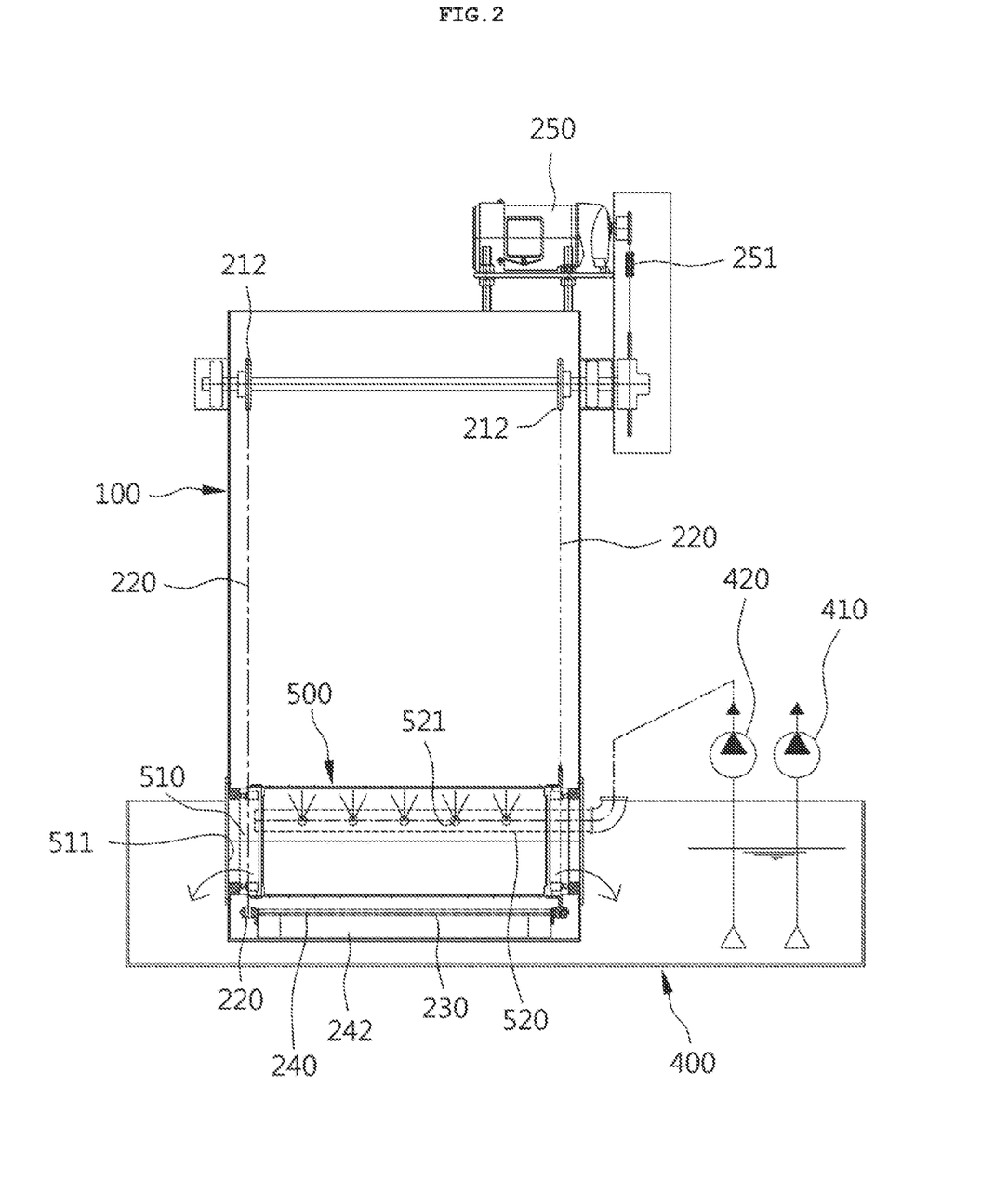
FIG. 2 is a side view illustrating the apparatus for discharging chips according to the embodiment of the present invention conveyer.
Figure 3:
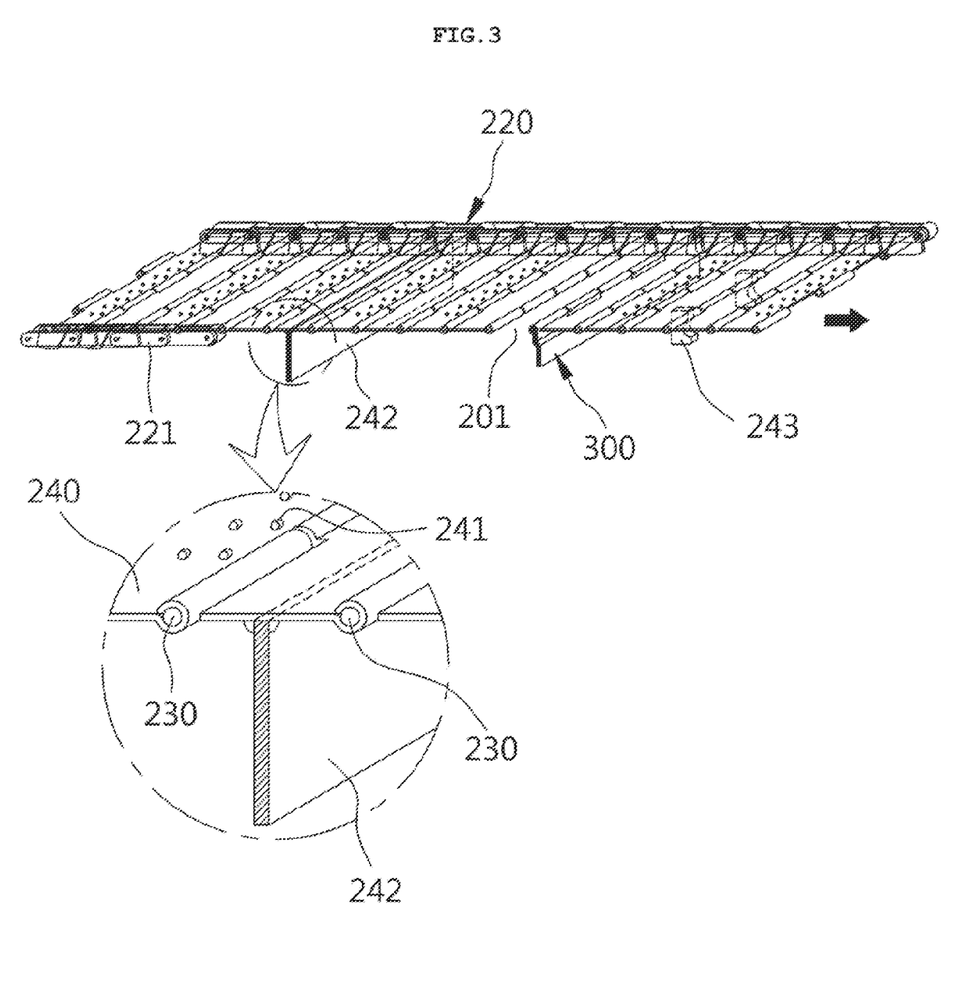
FIG. 3 is a perspective view illustrating the conveyer unit and opening/closing unit of the conveyer apparatus for discharging chips according to the embodiment of the present invention.

FIG. 1 is a front view illustrating a conveyer apparatus for discharging chips according to an embodiment of the present invention, FIG. 2 is a side view illustrating the apparatus for discharging chips according to the embodiment of the present invention conveyer, and FIG. 3 is a perspective view illustrating the conveyer unit and opening/closing unit of the conveyer apparatus for discharging chips according to the embodiment of the present invention.

As shown in these drawings, the conveyer apparatus for discharging chips (hereinafter referred to as the "conveyer apparatus") according to the embodiment of the present invention basically includes a tank body 100, a conveyer unit 200, and an opening/closing unit 300. In particular, the conveyer unit 200 is configured to have an opening 201 adapted to allow the inside and outside of the conveyer unit 200 with communicate with each other, and the opening/closing unit 300 is configured to automatically open or close the opening 201 depending on a location based on the operation of the conveyer unit 200.

These components are individually described in greater detail as follows.

First, the tank body 100 is a component that forms the appearance of the conveyer apparatus according to the embodiment of the present invention. The tank body 100 functions to accommodate the conveyer unit 200, and to receive cutting chips 10 and cutting oil, separate the cutting chips 10 from the cutting oil and provide guidance so that only the cutting chips 10 can be discharged.

The tank body 100 includes: a horizontal part 110 configured in the form of a container body having a space where the conveyer unit 200 is accommodated and operates, and configured to form a horizontal structure; and an inclined part 120 formed to be gradually inclined upward from the horizontal part 110. In this case, an inlet 111 configured such that the cutting chips 10 including the cutting oil enter therethrough is formed in the top surface of the horizontal part 110, and a chip outlet 121 configured to discharge the cutting chips 10 is formed in the bottom surface of an end of the inclined part 120.

In particular, in the embodiment of the present invention, the horizontal part 110 of the tank body 100 is configured to be located in the cutting oil tank 400 by way of example.

The cutting oil tank 400 is a container body configured to store the cutting oil separated from the cutting chips 10. In this case, the cutting oil tank 400 is provided with a cutting oil pump 410 configured to retransfer the cutting oil, stored in the corresponding cutting oil tank 400, to a machine tool.

Next, the conveyer unit 200 transfers the cutting chips 10 entering into the tank body 100 via the inlet 111 of the tank body 100 so that the cutting chips 10 can be discharged via the chip outlet 121 of the tank body 100.

The conveyer unit 200 is installed in the form of a caterpillar that reciprocates between both side ends of the tank body 100 in the state in which the conveyer unit 200 has been spaced apart from the inner walls of the tank body 100. The conveyer unit 200 includes a plurality of sprockets 211, 212 and 213, a plurality of chain assemblies 220, a plurality of support shafts 230, a plurality of blocking plates 240, and a drive motor 250.

In this case, the sprockets 211, 212 and 213 are installed along the surfaces of both inner side walls of the tank body 100, with the sprockets of each pair of sprockets of the sprockets 211, 212 and 213 being disposed opposite each other. In the embodiment of the present invention, the sprockets 211, 212 and 213 include a pair of first sprockets 211 disposed on both wall surfaces of an end of the horizontal part 110 of the tank body 100, a pair of second sprocket 212 disposed on the surfaces of both inner side walls of an end of the inclined part 120, and a pair of third sprocket 213 disposed on a portion where the horizontal part 110 and inclined part 120 of the tank body 100 meet each other.

Furthermore, each of the two chain assemblies 220 is installed to pass through the sprockets 211, 212 and 213 on each side, and is a combination that is formed by connecting a plurality of chains 221.

Furthermore, both ends of each of the support shafts 230 pass through each pair of opposite chains 221 of the two chain assemblies 220 while being coupled with the pair of opposite chains 221 of the chain assemblies 220, which is shown in FIG. 3.

Furthermore, each of the blocking plates 240 is configured in the form of a flat plate structure that blocks the gap between neighboring support shafts 230 while the front and rear ends thereof are coupled with the neighboring support shafts 230. The cutting chips 10 are transferred in the state in which the cutting chips 10 are carried on the outer surfaces of the blocking plates 240. In this case, the blocking plates 240 and the support shafts 230 may be preferably coupled with one another using, for example, a hinge coupling structure.

In particular, in the embodiment of the present invention, at least some of the blocking plates 240 that constitute the conveyer unit 200 are configured in the form of perforated plate structures in which a plurality of through holes 241 configured to pass the cutting oil through the blocking plates 240 are formed. That is, the cutting chips 10 separated from the cutting oil may rapidly and smoothly pass through the through holes 241 of the blocking plates 240 composed of the perforated plates.

Furthermore, in the embodiment of the present invention, a plurality of scrapers 242 and a plurality of separation hooks 243 are provide on the outer surfaces of some of the blocking plates 240 that constitute the conveyer unit 200.

Figure 4:
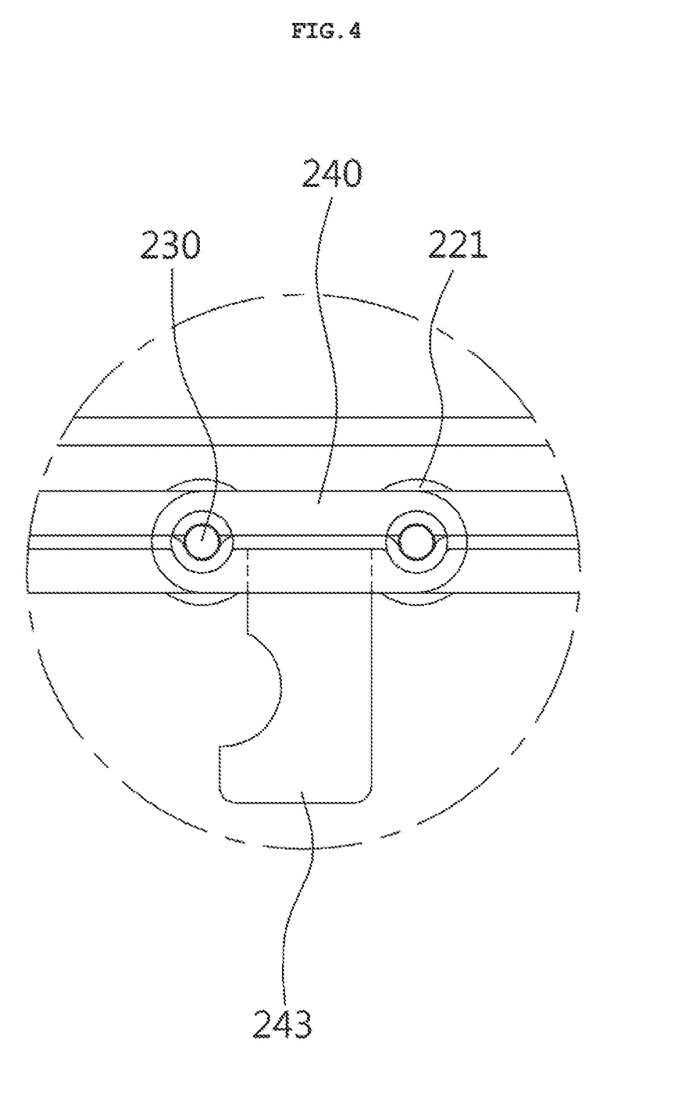
FIG. 4 is an enlarged view of portion A of FIG. 1.

In this case, the scrapers 242 are configured to scrape cutting chips 10 present between the blocking plates 240 and the tank body 100 and transfer the cutting chips 10 in the direction in which the cutting chips 10 are transferred by the corresponding conveyer unit 200, and are configured in the form of flat plates protruding toward the surfaces of the inner walls of the tank body 100. Furthermore, the separation hooks 243 are configured to forcibly separate cutting chips 10 present in a tangled state between the blocking plates 240 and the tank body 100, and are configured in the form of hooks, as shown in FIG. 4.

Furthermore, the drive motor 250 is operatively coupled with at least any one of the sprockets 211, 212 and 213, and is configured to rotate the corresponding sprocket. In the embodiment of the present invention, the drive motor 250 is coupled with the second sprocket 212 in the state in which the drive motor 250 is placed on the top surface of the end of the tank body 100 at which the chip outlet 121 is formed by way of example. In this case, the drive motor 250 and the second sprocket 212 are coupled with each other via a belt (or chains) 251 so that power can be transferred from the drive motor 250 to the second sprocket 212.

In particular, in the embodiment of the present invention, at least one opening 201 is formed between some of the blocking plates 240 constituting the conveyer unit 200 in the open state in which the blocking plate 240 is not present. That is, the inner space of the conveyer unit 200 communicates with the inner space of the tank body 100 via the opening 201, and thus fine cutting chips 10 entering into the inner space of the conveyer unit 200 are discharged into the tank body 100 via the opening 201.

Next, the opening/closing unit 300 is configured to selectively block the opening 201 of the conveyer unit 200.

Figure 5:
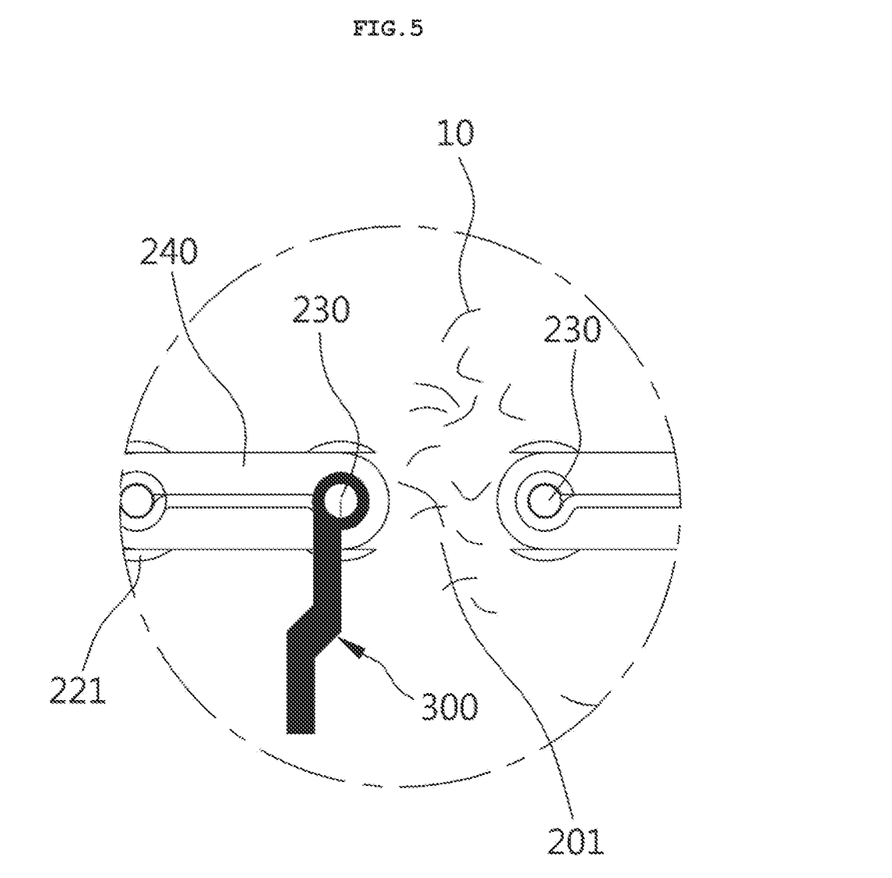
FIG. 5 is an enlarged view of portion B of FIG. 1.
Figure 6:
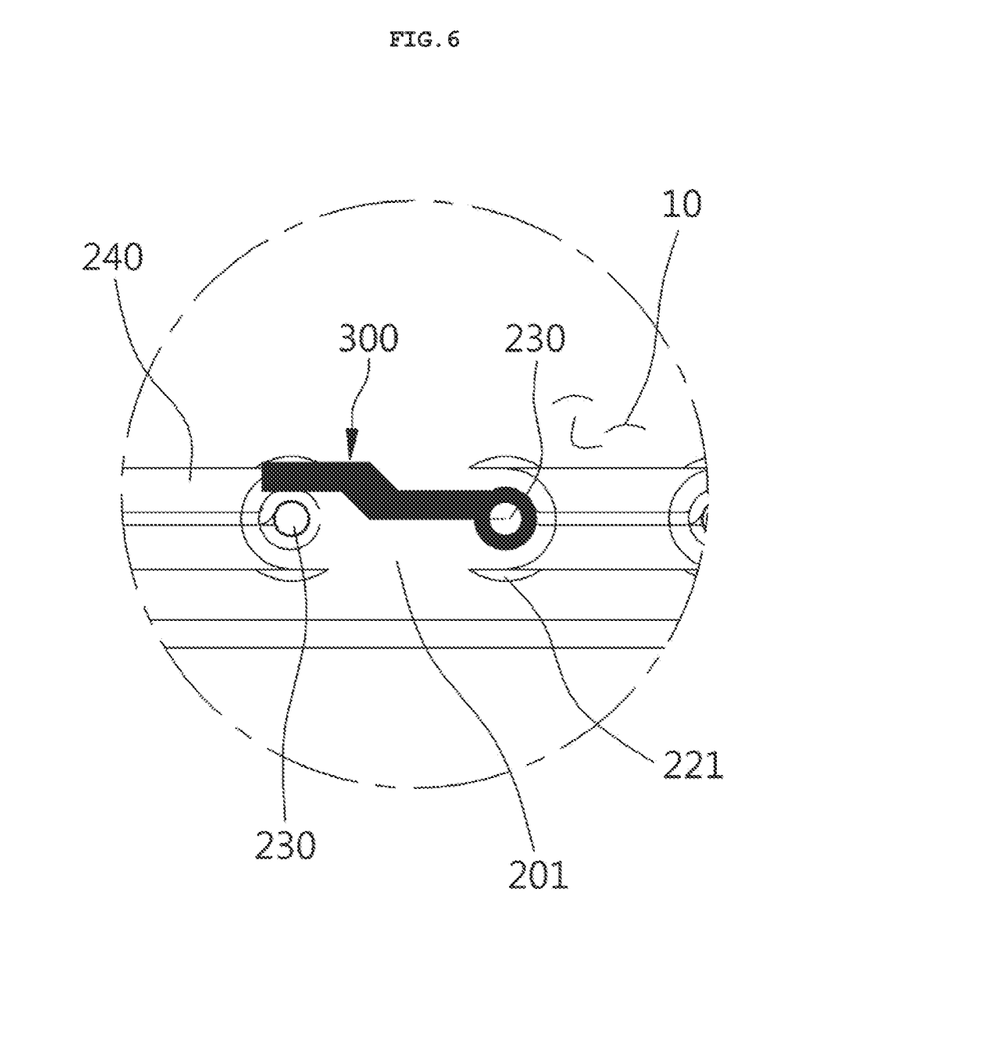
FIG. 6 is an enlarged view of portion C of FIG. 1.

The opening/closing unit 300 is rotatably mounted on any one of the two support shafts 230 in a portion where the opening 201 is formed. The opening/closing unit 300 is configured in the form of a plate having a hinge structure. Accordingly, when the corresponding opening 201 passes through the surface opposite the inner bottom surface of the tank body 100, the support shaft 230 is rotated around its center of rotation by the weight of the opening/closing unit 300 and thus the opening 201 is opened. In contrast, when the corresponding opening 201 passes through a surface opposite the inner top surface of the tank body 100, the opening/closing unit 300 covers the opening 201. These are shown in FIGS. 3, 5 and 6.

That is, when the corresponding opening 201 passes through the surface opposite the inner bottom surface of the tank body 100, the operation of the opening/closing unit 300 is performed, and thus the opening 201 is opened. In contrast, when the corresponding opening 201 passes through a surface opposite the inner top surface of the tank body 100, the opening 201 is closed, and thus cutting chips 10 entering into the inside of the tank body 100 are prevented from entering into the inside of the conveyer unit 200 via the opening 201.

Figure 7:
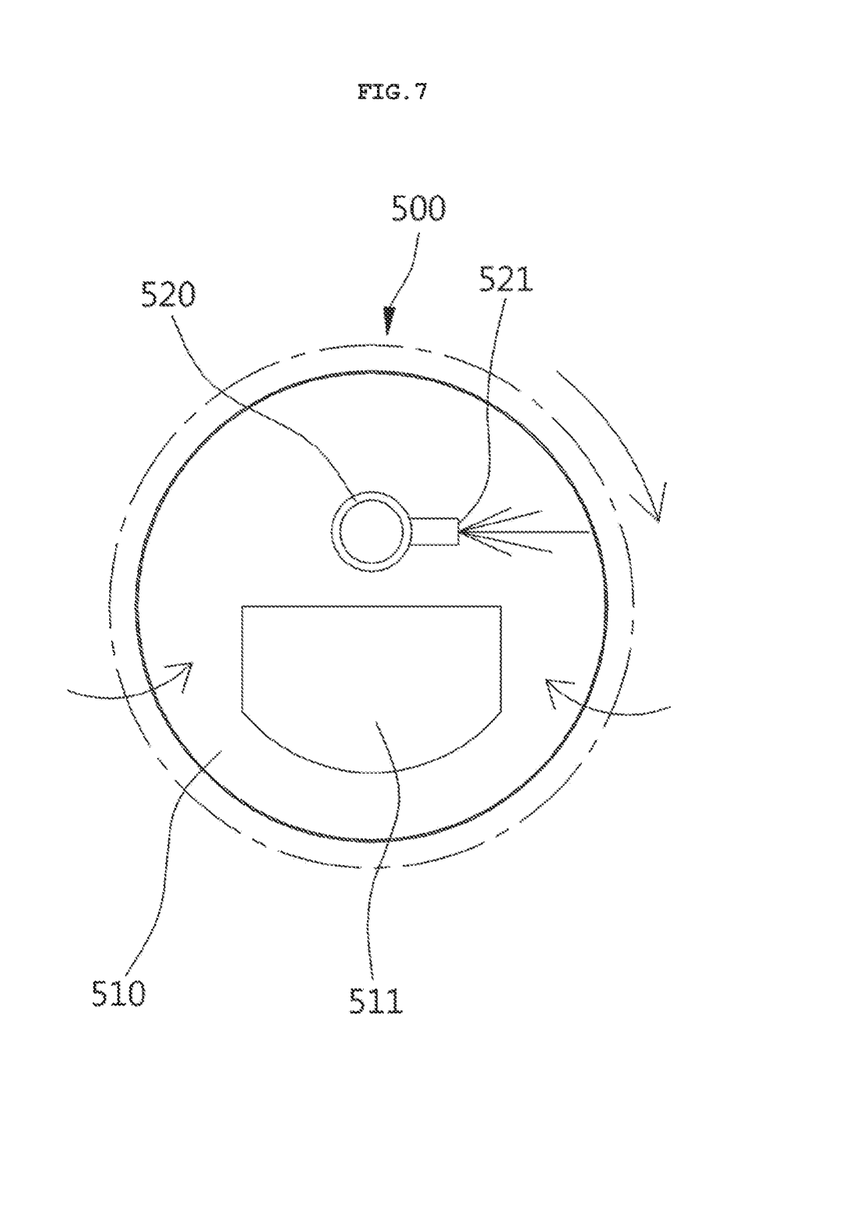
FIG. 7 is an enlarged view illustrating the structure of the filtering drum of the conveyer apparatus for discharging chips according to the embodiment of the present invention.

Meanwhile, in the embodiment of the present invention, a filter 500 configured to filter out fine cutting chips from cutting oil and store the cutting oil in the cutting oil tank 400 is additionally provided in the inner space of the conveyer unit 200, which is shown in FIGS. 2 and 7.

The filter 500 is configured in the form of a drum body whose circumferential surface is composed of a mesh net, and is rotatably mounted by a hollow rotating shaft 510. In this case, a cutting oil outlet 511 that communicates with the inside of the cutting oil tank 400 is formed in any one end of the rotating shaft 510, and thus only the cutting oil can pass through the filter 500 and then stored in the cutting oil tank 400 via the cutting oil outlet 511.

In particular, a cleaning liquid conduit 520 is installed through the filter 500, a plurality of spray holes 521 is formed through the circumferential surface of the portion of the cleaning liquid conduit 520 that is located inside the filter 500, and the cleaning liquid conduit 520 is configured to be provided with pumped cutting oil by a cleaning liquid pump 420 additionally installed in the cutting oil tank 400.

That is, this structure allows the surface of the filter 500 to be automatically washed by the spraying of the cleaning liquid even when the surface of the filter 500 is covered with fine cutting chips.

The process of discharging cutting chips using the above-described conveyer apparatus according to the embodiment of the present invention is described in greater detail below.

First, the conveyer apparatus according to the embodiment of the present invention is installed such that the inlet 111 of the tank body 100 can be disposed on the chip discharging side of a machine tool (not shown). In this case, a collection container 600 configured to collect the cutting chips 10 is located immediately below a portion where the chip outlet 121 of the tank body 100 of the conveyer apparatus is formed.

When the operations of the conveyer apparatus and the machine tool are controlled in the above state, large quantities of cutting chips 10 and cutting oil enter into the tank body 100 via the inlet 111 of the tank body 100 of the conveyer apparatus due to the machining of the workpiece attributable to the operation of the machine tool, and the entering cutting chips 10 and cutting oil are placed on the top surface of each blocking plate 240 of the conveyer unit 200 provided in the tank body 100. In this case, the cutting oil is discharged via the through holes 241 of the perforated blocking plates of the blocking plates 240, and the cutting chips 10 remain on the blocking plates 240.

Furthermore, in the above process, as the sprockets 211, 212 and 213 are driven by the drive motor 250 of the conveyer unit 200 and accordingly the chain assemblies 220 are driven, the blocking plates 240 are gradually moved. Therefore, as the cutting chips 10 placed on the blocking plates 240 are also moved, the cutting chips 10 are moved toward the chip outlet 121 of the tank body 100, fall down to the chip outlet 121, and are then collected in the collection container 600.

In particular, the cutting chips 10 placed on the blocking plates 240 are further forcedly moved by the scrapers 242 installed on some of the blocking plates 240. Furthermore, the cutting chips 10 in a tangled state are forcibly separated by the separation hooks 243, thereby preventing the problem in which the cutting chips 10 cannot be moved due to the tangled state.

Meanwhile, during the operation, the fine cutting chips 10 enter into the inside of the conveyer unit 200 via the gaps of the conveyer unit 200. If the entering fine cutting chips 10 are not discharged in real time, the fine cutting chips 10 are stacked on the surface of the filter 500 inside the conveyer unit 200, thus resulting in a reduction in the function of the filter 500.

However, during the operation of the conveyer unit 200, when the portion of the corresponding conveyer unit 200 where the opening 201 is formed passes through the surface opposite the inner bottom surface of the tank body 100, the opening/closing unit 300 is rotated downward around the support shaft 230 by the weight of the opening/closing unit 300, as shown in FIG. 5, and thus opens the opening 201. By doing so, the fine cutting chips 10 entering into the inside of the conveyer unit 200 can be discharged via the opening 201 in real time, thereby solving the problem in which the cutting chips 10 are stacked on the surface of the filter 500 inside the conveyer unit 200.

In particular, when the opening 201 of the conveyer unit 200 passes through the inner top surface of the tank body 100, the opening/closing unit 300 is closed to block the opening 201, as shown in FIG. 6, thereby preventing the cutting chips 10 entering into the inside of the tank body 100 from entering into the inside of the conveyer unit 200 via the opening 201. This is shown in FIG. 6.

Furthermore, the cutting oil entering into the inside of the tank body 100 passes through the filter 500, and flows into the cutting oil tank 400 via the outlet 511 of the rotating shaft 510. In this process, the cutting chips 10 are completely removed from the cutting oil by the filter 500, and are then stored in the cutting oil tank 400. In this case, the cutting oil inside the cutting oil tank 400 pumped via the cleaning liquid conduit 520 by the driving of the cleaning liquid pump 420 pushes the cutting chips attached to the surface of the filter 500 to the outside while being discharged via the spray holes 521 of the cleaning liquid conduit 520, and thus the surface of the filter 500 is automatically washed, thereby enabling smooth filtering to be continuously performed.

As a result, the conveyer apparatus for discharging chips according to the embodiment of the present invention enables the cutting chips 10 entering into the inner space of the conveyer unit 200 to be smoothly discharged to the outer space of the conveyer unit 200 via the opening 201 of the conveyer unit 200. Accordingly, damage to the conveyer unit 200 attributable to the cutting chips 10 can be prevented, and damage to the filter 500 provided in the inner space of the conveyer unit 200 can be also prevented.

Furthermore, the conveyer apparatus for discharging chips according to the embodiment of the present invention cutting enables the chips 10 in a tangle state to be forcibly separated by the additionally provided separation hooks 243. Accordingly, the defective operation of the conveyer unit 200 and the blocking of the chip outlet 121 attributable to the cutting chips 10 in a tangle state can be prevented.

Meanwhile, the present invention is not limited to a structure in which the cutting chips 10 are transferred to the chip outlet 121 of the tank body 100 in the state of being placed on the conveyer unit 200, such as that of the above-described embodiment.

Figure 8:
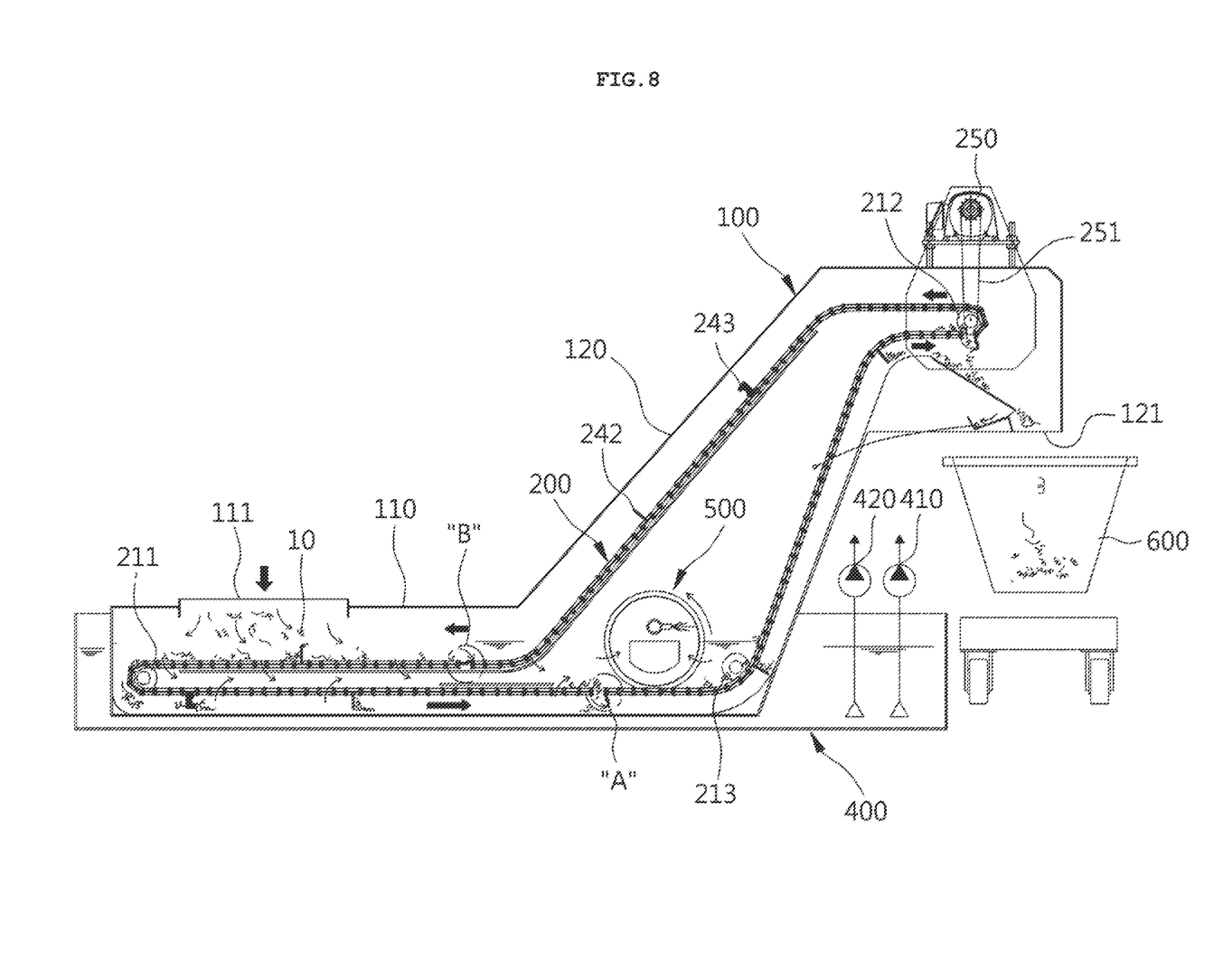
FIG. 8 is a front view illustrating a conveyer apparatus for discharging chips according to another embodiment of the present invention.
Figure 9:
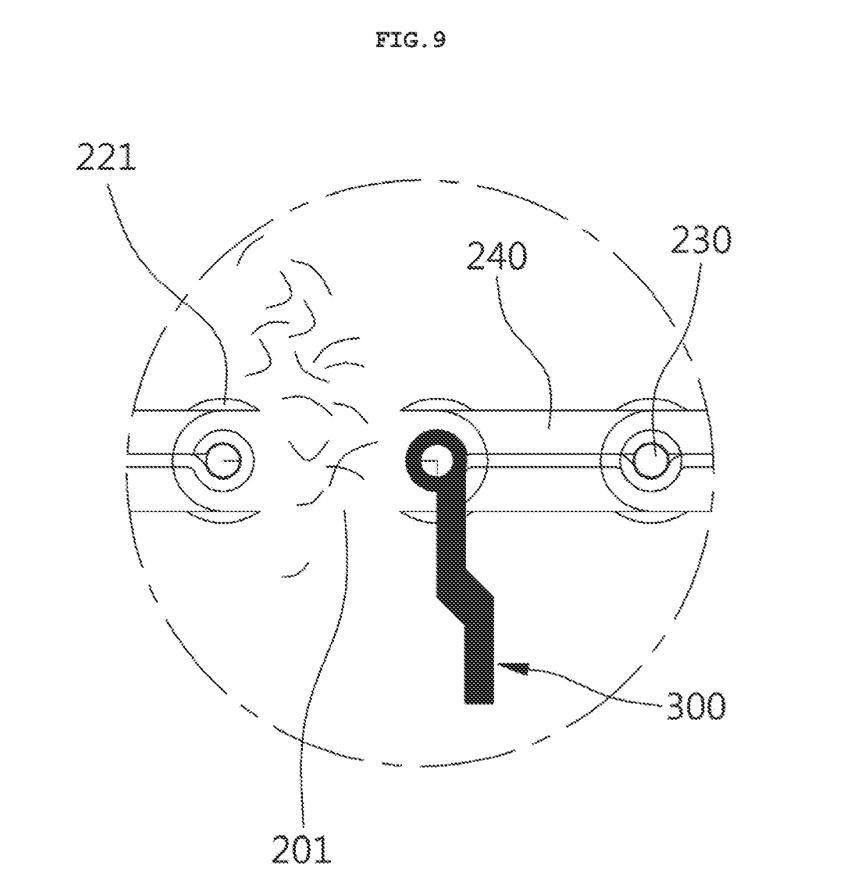
FIG. 9 is an enlarged view of portion A of FIG. 8.
Figure 10:
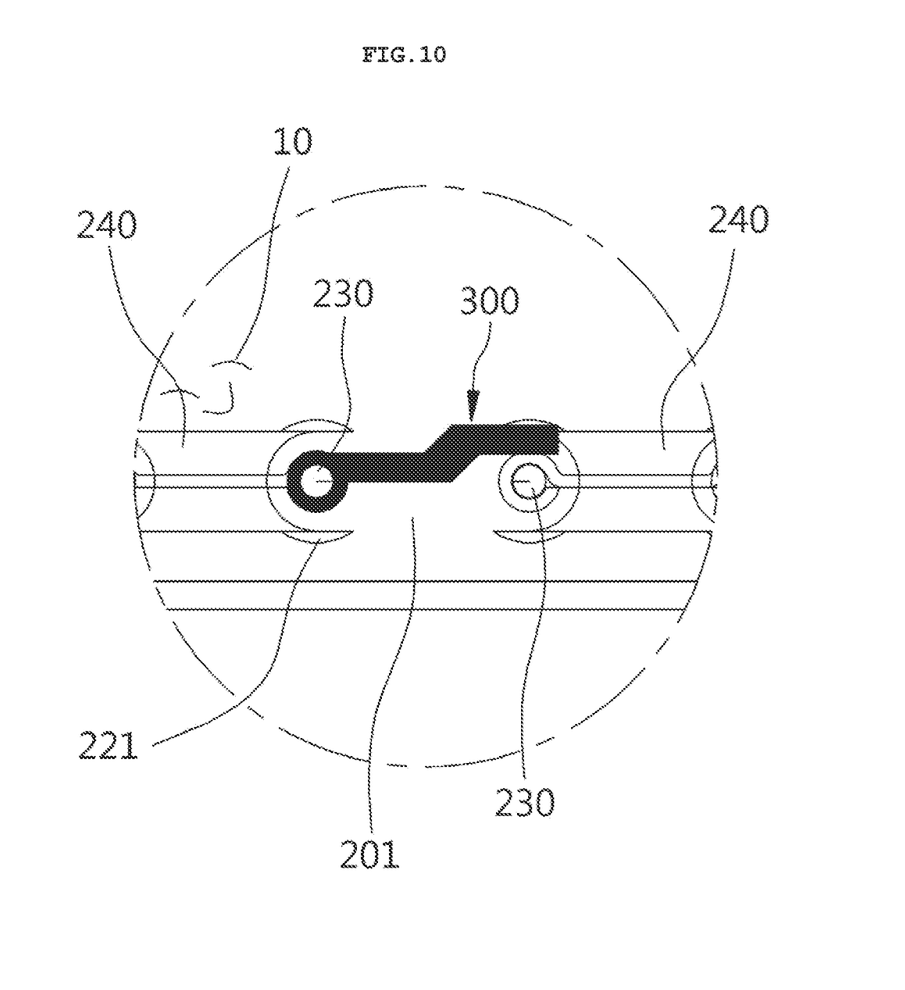
FIG. 10 is an enlarged view of portion B of FIG. 8.

That is, as shown in FIGS. 8 to 10, the cutting chips 10 entering via the inlet 111 of the tank body 100 may be transferred to a space between the bottom of the conveyer unit 200 and the bottom surface of the horizontal part 110 of the tank body 100, may be transferred upward along the inclined part 120 of the tank body 100 by the scrapers 242, and then may be discharged via the chip outlet 121.

It will be apparent that since the direction in which the cutting chips 10 are transferred is opposite that in the embodiment shown in FIGS. 1 to 7, the direction in which the opening/closing unit is closed is preferably opposite that in the embodiment, which is shown in FIGS. 9 and 10.

As described above, the conveyer apparatus for discharging chips according to the present invention is a useful invention that can be modified in various forms.

As described above, the conveyer apparatus for discharging chips according to the present invention has the advantages of preventing damage to the conveyer unit due to the cutting chips and also preventing damage to the filter provided in the inner space of the conveyer unit because the conveyer apparatus enables cutting chips entering into the inner space of the conveyer unit to be smoothly discharged into the outer space of the conveyer unit via the opening of the conveyer unit.

In particular, the conveyer apparatus for discharging chips according to the present invention has the advantage of preventing unwanted cutting chips from entering into the inner side of the conveyer unit because the opening is opened only when it is located in the lower portion of the tank body and closed when it is located in the upper portion of the tank body by the additional provision of the opening/closing unit configured to selectively open and close the opening.

Furthermore, the conveyer apparatus for discharging chips according to the present invention has the advantages of preventing the defective operation of the conveyer unit and the blocking of the chip outlet attributable to cutting chips in a tangle state because cutting chips in a tangle state can be forcibly separated by the additional provision of the separation hooks.

Although the specific embodiments of the present invention have been disclosed for illustrative purposes, those skilled in the art will appreciate that various modifications, additions and substitutions are possible without departing from the scope and spirit of the invention as disclosed in the accompanying claims.

What is claimed is:

1. A conveyer apparatus for discharging chips, comprising:
   a tank body configured such that the tank body is configured in a form of a container body having an operation and installation space, an inlet via which cutting chips containing cutting oil enter is formed in a top surface of one side of the tank body, and a chip outlet via which the cutting chips are discharged is formed in a bottom surface of a remaining side of the tank body;
   a conveyer unit installed in a form of a caterpillar that reciprocates between both side ends of the tank body while being spaced apart from inner walls of the tank body, and configured to have at least one opening that is open so that inner and outer spaces of the conveyer unit communicate with each other; and
   an opening/closing unit installed to block the opening of the conveyer unit, and configured to operate so as to open the opening when the corresponding opening passes through a surface opposite an inner bottom surface of the tank body,
   wherein an outer surface of the conveyer unit comprises:
   a plurality of scrapers configured to transfer cutting chips present between the conveyer unit and the tank body in a direction in which cutting chips are transferred by the corresponding conveyer unit; and
   a plurality of separation hooks configured to forcibly separate cutting chips present between the conveyer unit and the tank body.

2. The conveyer apparatus of claim 1, wherein the conveyer unit comprises:
   a plurality of sprockets installed to be opposite each other along surfaces of both side walls of the tank body;
   two chain assemblies formed by connecting a plurality of chains that are installed around the sprockets;
   a plurality of support shafts configured such that both ends of each of the support shafts pass through each chain of the two chain assemblies while being coupled with the two chain assemblies;
   a plurality of blocking plates configured such that each of the blocking plates is installed to block a gap between neighboring support shafts while front and rear ends of the blocking plate are being coupled with the neighboring support shafts, and configured to provide guidance so that cutting chips are carried on outer surfaces of the blocking plates; and a drive motor operatively coupled with at least any one of the sprockets, and configured to rotate the corresponding sprocket.

3. The conveyer apparatus of claim 2, wherein:

the opening is formed between at least some of the support shafts constituting the conveyer unit in an open state in which a corresponding blocking plate is not present; and the opening/closing unit is rotatably mounted on any one of two support shafts in a portion where the opening is formed, and the opening/closing unit is configured in a form of a hinge structure plate so that it is rotated around the support shaft by a weight thereof and thus opens the opening when the corresponding opening passes through a surface opposite an inner bottom surface of the tank body and closes the opening when the corresponding opening passes through a surface opposite an inner top surface of the tank body.

4. The conveyer apparatus of claim 2, wherein at least some of the blocking plates that constitute the conveyer unit are formed in perforated plate structures in which a plurality of through holes configured to pass cutting oil therethrough is formed.

\* \* \* \* \*